(12) United States Patent
Nakazaki et al.

(10) Patent No.: US 8,427,393 B2
(45) Date of Patent: Apr. 23, 2013

(54) MULTI-LAYER DISPLAY APPARATUS

(75) Inventors: Yasuhiko Nakazaki, Gifu (JP);
Yoshinori Saito, Gifu (JP); Tsutomu Fujita, Gifu (JP); Yoichi Fukushima, Daito (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 229 days.

(21) Appl. No.: 13/041,078

(22) Filed: Mar. 4, 2011

(65) Prior Publication Data
US 2011/0215991 A1   Sep. 8, 2011

(30) Foreign Application Priority Data

Mar. 5, 2010   (JP) ................................ 2010-048506

(51) Int. Cl.
*G09G 5/00*   (2006.01)
(52) U.S. Cl.
USPC ..................................... 345/5; 345/6; 349/15
(58) Field of Classification Search .................. 345/3.1, 345/4–6, 76, 87, 102; 349/15, 64, 112; 353/7, 353/8; 359/462, 465
See application file for complete search history.

(56) References Cited

U.S. PATENT DOCUMENTS

| | | | | |
|---|---|---|---|---|
| 5,581,378 A | * | 12/1996 | Kulick et al. | 359/9 |
| 5,745,197 A | * | 4/1998 | Leung et al. | 349/77 |
| 7,619,585 B2 | * | 11/2009 | Bell et al. | 345/9 |
| 7,742,124 B2 | * | 6/2010 | Bell | 349/74 |
| 7,932,874 B2 | * | 4/2011 | Kurahashi et al. | 345/6 |
| 7,944,465 B2 | * | 5/2011 | Goulanian et al. | 348/51 |
| 2005/0104801 A1 | * | 5/2005 | Sugiura | 345/5 |
| 2008/0117363 A1 | * | 5/2008 | Fujita et al. | 349/74 |
| 2009/0059103 A1 | * | 3/2009 | Azor et al. | 349/8 |
| 2009/0251625 A1 | * | 10/2009 | Kwon et al. | 349/15 |
| 2010/0123839 A1 | * | 5/2010 | Lu | 349/15 |
| 2010/0305230 A1 | * | 12/2010 | Li et al. | 522/62 |
| 2011/0176073 A1 | * | 7/2011 | Chang et al. | 349/15 |

FOREIGN PATENT DOCUMENTS

| | | |
|---|---|---|
| JP | 3335998 B2 | 8/2002 |
| WO | 99/42889 A1 | 8/1999 |

\* cited by examiner

*Primary Examiner* — Joe H Cheng
(74) *Attorney, Agent, or Firm* — NDQ&M Watchstone LLP

(57) ABSTRACT

The multi-layer display device apparatus has a first display part, a second display part arranged at the rear-side of the first display part, a transforming part arranged between the first and the second display part. The transforming part transforms a linear polarized light in to a non-polarized light. Further, the display device has a storage part which stores a parameter for adjusting the image quality of the image displayed on the first and second display part, and an image adjustment part which adjusts the image quality of the image displayed in the first and second display part based on the parameter stored in the storage part.

4 Claims, 3 Drawing Sheets

Fig.3

|  | Sharpness | Edge Enhance | Contrast Enhance | Hue | Saturation | Brigthness |
|---|---|---|---|---|---|---|
| 1st Parameter | A1 | B1 | C1 | D1 | E1 | F1 |
| 2nd Parameter | A2 | B2 | C2 | D2 | E2 | F2 |

MULTI-LAYER DISPLAY APPARATUS

CROSS-REFERENCE TO RELATED APPLICATIONS

This application is based on Japanese Patent Application No. 2010-048506 filed on Mar. 5, 2010, the contents of which are hereby incorporated by reference.

BACKGROUND OF THE INVENTION

1. Field of the Invention

The present invention relates to a multi-layer display apparatus having a plurality of display parts, one of which is layered on the other one.

2. Description of the Related Art

In a multilayer display in which two display parts have been arranged in layers, a distance of a displayed synthesized picture and an observer changes depending on whether the portion of the picture is displayed on the front-side display part or the rear-side display part. Therefore, such multilayer display can display more realistic 3D images compared with the conventional single-layered display.

Each of the display part of the multilayer display has a structure such that a liquid crystal panel is sandwiched between a pair of polarizing plates. However, when a light polarized by the polarizing plate of the rear-side display part enters the front-side display part, moire may occur due to an interference of the light. In order to suppress this moire, it is effective to place diffusion board between these display parts.

However, when the diffusion board is arranged, the image of the rear-side display reaches an observer after passing through the diffusion board, while the image of the front-side display does not passing the board. Therefore, the images of the front-side and rear-side displays look different to the observer.

SUMMARY OF THE INVENTION

The multi-layer display device apparatus of the present invention has a first display part, a second display part arranged at the rear-side of the first display part, a transforming part arranged between the first and the second display part. The transforming part transforms a linear polarized light in to a non-polarized light. Further, the display device has a storage part which stores a parameter for adjusting the image quality of the image displayed on the first and second display part, and an image adjustment part which adjusts the image quality of the image displayed in the first and second display part based on the parameter stored in the storage part.

DESCRIPTION OF THE DRAWINGS

FIG. 3 shows a table including the adjustment parameter of image quality.

DESCRIPTION OF THE PREFERRED EMBODIMENTS

The embodiment of the present invention is described below. The multilayer display 10 having a two-layered display parts is one of the embodiments.

Figure 1:
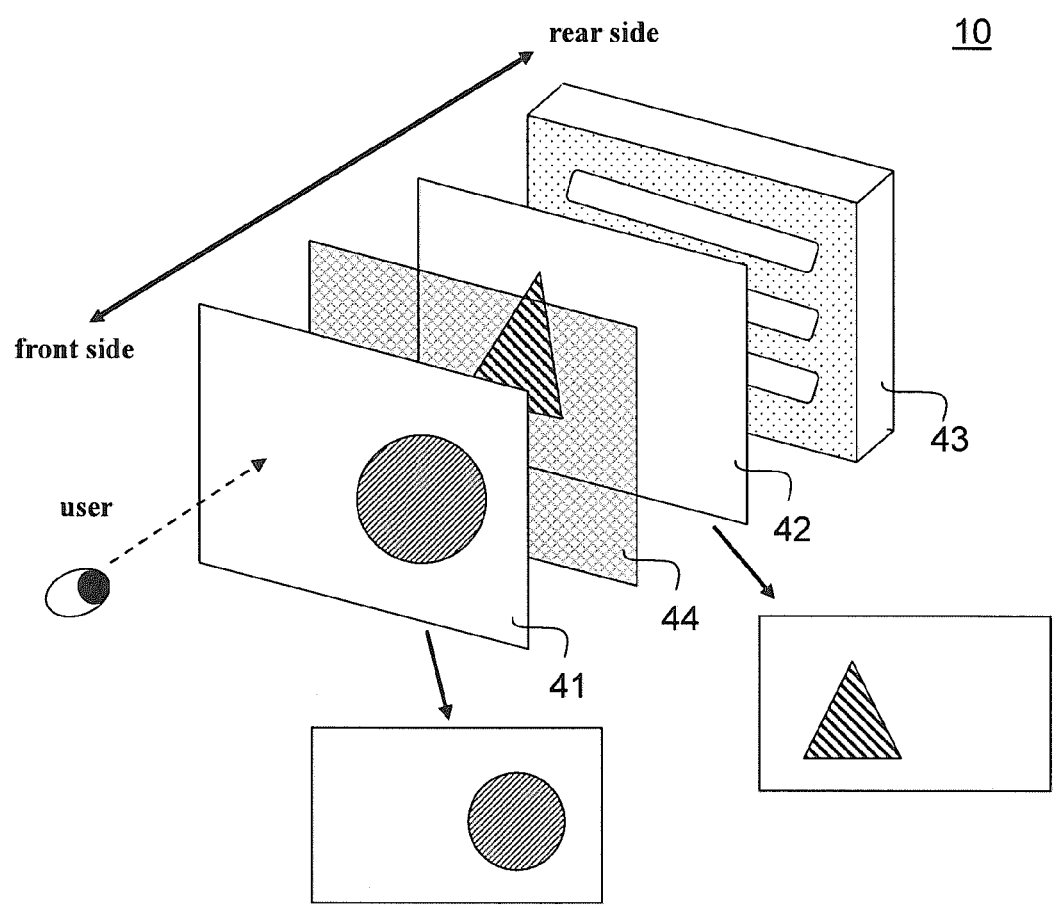
FIG. 1 shows a simplified appearance of the multilayer display 10.

FIG. 1 shows a simplified appearance of the multilayer display 10. In the display 10, a first liquid crystal panel 41, a diffusion board 44, a second liquid crystal panel 42, and a backlight 43 is arranged in this order from the front-side to the rear-side. Each of the panels 41 and 42 is sandwiched by a pair of polarizing plates (the illustration is emitted in FIG. 1). The backlight 43 is formed by CCFL or LED, and is a light source for each the panels 41 and 42. The board 44 transforms a polarized light (light in which there's a preferred direction for the electric and magnetic field vectors in the wave) emitted from the polarizing plate of the panel 42 to a non-polarized light (the waves come in with electric and magnetic field vectors in random directions). If the light polarized by the panel 42 enters the panel 41, moire may occur due to interference of the light. However, by using the board 44, this moire is suppressed. Further, in the rear-side of the backlight 43, a circuit board for controlling these components is arranged.

The light transmitted the second panel 42 reaches the observer by passing along the diffusion board 44 and the first panel 41. Thereby, the observer can view a synthesized image displayed in the panels 41 and 42.

Figure 2:
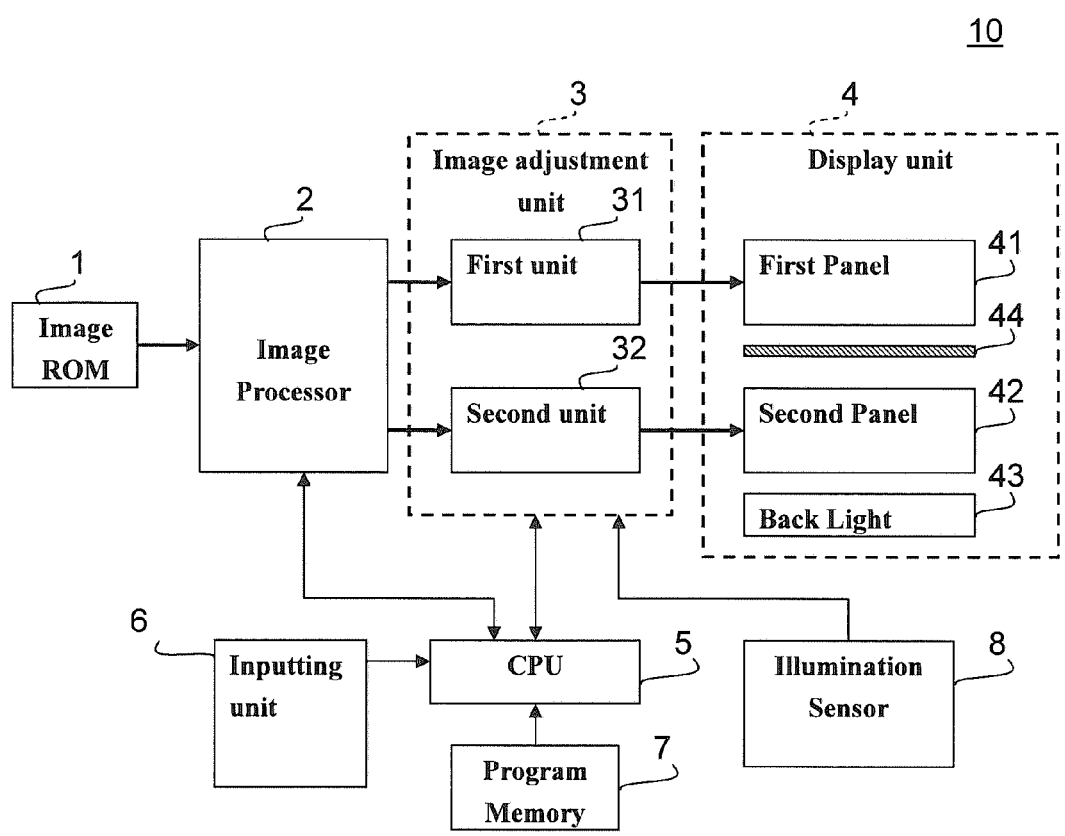
FIG. 2 is a block diagram showing the configuration of the multilayer display 10.

FIG. 2 is a block diagram showing the configuration of the multilayer display 10. The display 10 has an image ROM 1, an image-processor 2, an image quality adjustment unit 3, a display unit 4 (comprising the panels 41 and 42, the backlight 43, and the diffusion board 44), a CPU 5, operation inputting unit 6, a program ROM 7, and an illumination sensor 8.

In the ROM 1, the image information (or image data) is stored.

The image-processor 2 read outs the encoded image data (or file) stored in the ROM 1 according to a direction from the CPU 5. Then the processor 2 decodes the read out data and or divides the data into a first data used for displaying on the panel 41, and the second data for displaying on the panel 42. The processor 2 then outputs the first and the second data to the information on the 1st picture and the 2nd picture to the image quality adjustment unit 3.

The unit 3 has the first image quality adjustment unit 31 and the second image quality adjustment unit 32. The unit 31 adjusts the image quality of the first image data and outputs the adjusted data to the panel 41. The unit 32 adjusts the image quality of the second image data and outputs the adjusted data to the panel 42.

The unit 3 performs the following processing against the data transmitted from the processor 2; (i) Sharpness process to the whole image, (ii) Enhancing the edge (or outline) of the object image or characters (letters), (iii) Enhancing the contrast of the image, and (iv) Adjusting the hue, chroma saturation, and brightness etc. The unit 3 is constituted by separate units 31 and 32 because the different kind of image quality adjustment is performed to the first image data and the second image data.

Instead from the ROM 1 as described above, the processor 2 may acquire an image data from a broadcast signal. The image data may be acquired from PCs via DVI interface etc. The image data may also be obtained from a contents server via Internet.

The CPU (Central Processing Unit) 5 performs various kinds of operations and control.

The operation inputting unit 6 is a remote controller separated from the display 10, or a manual operation button arranged in the peripheral (outside) of the display part or side-face of the display 10. If the display 10 has a light transmitting touch panel in the front side of the panel 41, this touch panel becomes the unit 6. The input (or directions) signal from the unit 6 is transmitted to the CPU 5.

The program memory 7 stores a program for operating the CPU 5 or data referred by the CPU 5. The memory 7 further stores a table including the adjustment parameter for the image quality adjustment.

This table includes information of the "first adjusting parameters" and the "second adjusting parameters", as shown in FIG. 3. In detail, each of the adjustment parameters includes the sharpness, edge-enhancing, contrast enhancing, hue, chroma saturation, and brightness. The first parameters regards to the image quality adjustment performed by the unit 31. The second parameters regards to the image quality adjustment performed by the unit 32. In this embodiment, the first and second parameters range between 0 and 100. When this parameter is small, a weak adjustment is performed. When the parameter is large, a strong adjustment is performed. When the parameter is 50, which is the median of the range, the image quality of the outputting image is same as the image stored in ROM 1.

The CPU 5 sets the first and second adjustment parameters to the unit 3 with reference to the above-mentioned table. Thereby, the image quality of the image displayed on the panels 41 and 42 are adjusted according to the first and second parameters respectively.

Next, a method for determining the parameters for image quality adjustment stored in the table is explained.

In the multilayer display of the present embodiment, the diffusion board is adopted in order to prevent moire between the images of two LCD panels. However, there is a disadvantage that the because of the insertion of the board 44, the image quality (preciseness or clearness) of the panel 42, which is on the rear-side of the board, may worsen.

Thus, under an assumption that the image quality deteriorate due to a light transmission through the board 44, the contrast enhance, sharpness, or edge enhance for the second panel 42 is made stronger than the first panel 41. For example, when each of the parameters in the first parameters (group) are set to 50, the parameters in the second parameters (group) should be set larger than 50 (for example, 60).

Generally, in a display apparatus, the preciseness or clearness of the image improves if the edge enhancing process or sharpness process is performed. However, since the noise component is enhanced also, a fine (or minute) noise may occur in an image having a gradual change in the gradation (such as an image of the sky). Further, when the enhancing image includes a line or a character, a jaggy noise may occur. Therefore, the amount of the first or second adjustment parameters should be determined considering these facts.

Further, when the first adjustment parameter is changed, the second parameter may be changed automatically. For example, the second parameter may be controlled so that it becomes 1.2 times larger than the first parameter consistently. Here, the 1.2 corresponds to 60 divided by 50. Hereafter, the mode which the second parameter is controlled conforming with the first parameter is called "Automatic Compensation Between Layers (ACBL) mode".

On the other hand, when the ACBL mode is OFF, the second parameters does not change automatically conforming to the first parameters. In this case, the first and the second parameters should be adjusted independently.

Regarding to the hue, chroma saturation, and brightness, they may be affected by the characteristic dispersion between the liquid crystal panels 41 and 42 as well as the diffusion board 44. Therefore, when the ACBL mode is ON, the second parameters for contrast enhancing, sharpness, or edge enhancing is controlled so that it becomes first predetermined times larger than the first parameters. Here, the "first predetermined times" is determined based on the characteristic of the board 44. On the other hand, the second parameters for hue, chroma saturation, or brightness, is controlled so that it becomes second predetermined times larger than the first parameters. Here, the "second predetermined times" is determined based on the characteristic of the panels 41 and 42.

In compliance with the information detected by the illumination sensor 8 which detects the illumination of the sunlight irradiating the liquid crystal panel, the adjustment parameters, such as parameter for contrast enhance, may be controlled dynamically. When the sunlight is irradiating the LCD panel, it is better to emphasize the contrast in order to secure the visibility of the image displayed by the panel. On the other hand, when it is nighttime, the visibility of the image may be satisfactory even though the contrast is low. Therefore, the first parameters for the front-side panel (panel 41) may be controlled according to the information detected by the sensor 8. Further, when the ACBL mode is ON, the second parameters for the rear-side panel (panel 42) may be controlled so that it conforms to the first parameters.

Further, the preference between the individual users may be varied. For example, some user might prefer brighter image, some user might prefer an image with strong contrast, or conversely, an image with weak sharpness. Therefore, the adjustments parameters for image quality may be changed according to the direction of the user. In such case, the second parameter may be changed automatically when the user manually changed the first parameter.

The first and second adjustment parameters are set according to a value or a program stored in the program memory 7. For example, the above-mentioned value 50 for the first parameter and 60 for the second parameter is stored in the memory 7. Further, when it is necessary to change the first parameters etc. according to the illumination information etc., the adjustment parameters are controlled according to the program memorized in the memory 7.

The amount of the first and the second adjustment parameters may be updated by user. For example, users may change this parameter according to their preference. When the multilayer display is used as a digital signage display for a public facility, theses parameters may be changed only by the administrator or the owner of the signage display, or by the contents provider wherein the contents is a video or still image displayed in the signage display.

According to the multilayer display 10 displayed above, since the adjustment can be performed to the images displayed in each panels 41 and 42 independently, it can suppress the moire as well as the maintaining the preciseness etc. of the images.

In the some of the examples described above, the second parameters is set larger than the first parameters, however, this is sometimes unnecessary. For example, when displaying a 3D image, the image looks a realistic stereoscopic image when an object in the front-side is shown clearly and the object in the rear-side is shown blurred. Therefore, by utilizing a characteristic that the image is blurred when the image light passes along the diffusion board 44, the second parameter may be set to a value same as the first parameters.

On the other hand, when displaying an image showing letters (or characters) of the rear-side panel 42, it is better to display a clear image on the panel 42. For example, when displaying a slot machine using a multilayer display, the frame portion of roulette may be displayed on the front-side panel 41 and the picture (pattern) of the roulette may be displayed on the panel 42. In such a case, in order to show a clear image on the panel 42, the second parameter should be set larger than the first parameter. The same applies to a case when displaying a map image in the panel 42.

Accordingly, the program memory 7 may store a program which controls the adjustment parameters so that the first and second parameter is kept same value when the image to be displayed is a 3D image, and controls the adjustment parameters so that the second parameter is kept larger than the first parameter by predetermined ratio when the image to be displayed is a slot machine or text image. In this case, the category information of the image (such as 3D, slot machine, or text) may be described in the header portion of the image data file. Then CPU 5 read out the information in the header. According to the read out information, the CPU 5 selects the program or parameters in the adjustment parameter table stored in the memory 7, and thereby the first and second adjustment parameters may be determined.

When image quality adjustment is given to the original image data directly, the data size increases due to decline in the compression ratio of the image data. Further, when a plurality of data is stored in order to satisfy the wide variety of the users preferences, environmental conditions (such as sunlight irradiation), or category of the displaying image. However, according to the multilayer display 10, since the image quality adjustment is performed in the image quality adjustment unit 3 to the image data stored in ROM 1, there is no increase in the image data size due to the compression ratio, and thus, it can reduce the size and cost for the ROM memory. Further, it is not necessary to prepare a plurality of data files for same contents data, it can avoid the size increase in ROM or implementing an additional ROM, and thus it can reduce the cost necessary to manufacture the display 10.

The embodiment of the present invention is described as above. However, the scope of the present invention is not limited thereto, and the present invention may be implemented by being subjected to various modifications without departing from the gist of the present invention. For example, the multilayer display 10 described above is a two-layered display, however, the present invention can be applied to the multilayer displays having three or more layers (LCD panels).

What is claimed is:

1. A multi-layer display device apparatus comprising:
   a first display part;
   a second display part arranged at the rear-side of the first display part;
   a transforming part arranged between the first and the second display part, wherein the transforming part transform a linear polarized light in to a non-polarized light;
   a storage part which stores a parameter for adjusting the image quality of the image displayed on the first and second display part, and
   an image adjustment part which adjusts the image quality of the image displayed in the first and second display part based on the parameter stored in the storage part.

2. A display according to claim 1, wherein
   the image adjustment part performs a strong contrast enhancing, sharpness processing, or edge enhancing to the image displayed in the second display part more than the first display part.

3. A display according to claim 1, further comprising
   a ROM storage part which stores an image data for displaying on the first and second display parts, wherein
   the image adjustment part performs image quality adjustment to the picture stored in the storage part.

4. A display according to claim 1, wherein
   the parameter stored in the storage part is manually changeable by a user.

\* \* \* \* \*